United States Patent [19]

Ng

[11] Patent Number: 5,326,172
[45] Date of Patent: Jul. 5, 1994

[54] MULTIWAVELENGTH PYROMETER FOR GRAY AND NON-GRAY SURFACES IN THE PRESENCE OF INTERFERING RADIATION

[75] Inventor: Daniel L. P. Ng, Shaker Heights, Ohio

[73] Assignee: The United States of America as represented by the Administrator of the National Aeronautics and Space Administration, Washington, D.C.

[21] Appl. No.: 991,403

[22] Filed: Dec. 14, 1992

[51] Int. Cl.$^5$ .......................... G01J 5/62; G01J 5/52; G01J 5/00

[52] U.S. Cl. .................. 374/126; 374/128; 374/129; 374/9; 364/557; 250/338.1

[58] Field of Search .............. 374/126, 128, 129, 161, 374/9; 250/338.1, 341; 364/557

[56] References Cited

U.S. PATENT DOCUMENTS

| | | | |
|---|---|---|---|
| 3,433,052 | 3/1969 | Maley | 374/129 |
| 3,462,224 | 8/1969 | Woods et al. | 374/126 |
| 3,492,869 | 2/1970 | Toyota et al. | 374/126 |
| 3,504,524 | 4/1970 | Maley | 374/126 |
| 3,796,099 | 3/1974 | Shimotsuma et al. | 374/126 |
| 3,924,469 | 12/1975 | Brandli et al. | 374/129 |
| 4,417,822 | 11/1983 | Stein et al. | 374/126 |
| 4,645,358 | 2/1987 | Blume | 374/122 |
| 4,647,774 | 3/1987 | Brisk et al. | 374/128 |
| 4,708,474 | 11/1987 | Suarez-Gonzalez | 374/127 |
| 4,840,496 | 6/1989 | Elleman et al. | 374/124 |
| 4,919,542 | 4/1990 | Nulman et al. | 374/126 |
| 5,132,922 | 7/1992 | Khan et al. | 364/557 |
| 5,156,461 | 10/1992 | Mosleni et al. | 374/126 |
| 5,165,796 | 11/1992 | Gat et al. | 374/126 |

FOREIGN PATENT DOCUMENTS

| | | | |
|---|---|---|---|
| 0122923 | 9/1981 | Japan | 374/9 |
| 0122924 | 9/1981 | Japan | 374/128 |
| 0171643 | 10/1983 | Japan | 374/129 |
| 1436180 | 5/1976 | United Kingdom | 374/126 |

OTHER PUBLICATIONS

Hunter et al.; "Multiwavelength Pyrometry-An Improved Method," Optical Engineering, vol. 24, No. 6 (Nov.-Dec. 1985), pp. 1081-1085.

Primary Examiner—Diego F. F. Gutierrez
Attorney, Agent, or Firm—James A. Mackin; Gene E. Shook; Guy M. Miller

[57] ABSTRACT

A method and apparatus for detecting the temperature of gray and non-gray bodies in the presence of interfering radiation. A gray body has a constant emissivity less than 1 and a non-gray body has an emissivity which varies with wavelength. The emissivity and reflectivity of the surface is determined over a range of wavelengths. Spectra are also measured of the extraneous interference radiation source and the surface of the object to be measured in the presence of the extraneous interference radiation source. An auxiliary radiation source is used to determine the reflectivity of the surface and also the emissivity. The measured spectrum of the surfaces in the presence of the extraneous interference radiation source is set equal to the emissivity of the surface multiplied by a Planck function containing a temperature term T plus the surface reflectivity multiplied by the spectrum of the extraneous interference radiation source. The equation is then solved for T to determine the temperature of the surface.

2 Claims, 5 Drawing Sheets

MULTIWAVELENGTH PYROMETER FOR GRAY AND NON-GRAY SURFACES IN THE PRESENCE OF INTERFERING RADIATION

ORIGIN OF THE INVENTION

This invention was made by an employee of the United States Government and may be manufactured or used by the United States Government without the payment of any royalties thereon or therefor.

TECHNICAL FIELD

This invention generally relates to multiwave pyrometry for gray and non-gray surfaces. The invention particularly relates to multiwavelength pyrometry for gray and non-gray surfaces which takes into account extraneous interfering radiation to accurately determine the temperature of a surface.

BACKGROUND ART

In pyrometry, the temperature of a surface can be determined by measuring the radiation emanating from the surface. The emanating radiation will usually contain two components: the radiation emitted from the surface and radiation from other sources which is reflected off the surface.

Kirchoff's law states that emissivity of a surface plus reflectivity of a surface is equal to 1. For a theoretical black body, the emissivity is equal to 1 and the reflectivity is equal to 0. A black body is a theoretical object, that emits energy with complete efficiency at all Wavelength, and absorbs all energy directed at it at all wavelengths and therefore has no reflectivity.

A black body cannot exist in reality, because no surface radiates or absorbs all energy. A gray body is defined as an object which has a constant emissivity and therefore constant reflectivity at all wavelengths. As the emissivity of a gray body remains constant over various wavelengths, the emissivity of a gray body object is usually known or can be determined. From the emissivity, the temperature of the object can be determined by solving a Planck formula for temperature.

A nongray body is a body which has its emissivity vary depending on the wavelength measured. Therefore, to accurately determine the temperature of a nongray body using conventional pyrometry techniques, the emissivity of the nongray body must be known at the wavelength at which the pyrometer is operating.

A conventional single color pyrometer measures the radiation emitted from an object to be measured. As the radiation contains both an emission component from the object being measured and a reflection component containing radiation reflected off the object being measured, the emissivity of the measured object must be known to obtain an accurate temperature measurement. However, a single color pyrometer might be able to ignore the reflectivity of a surface to be measured if its reflectivity is small when compared to its emissivity.

Two color pyrometers measured the emitted radiation at two wavelengths and assumes that the ratio of emissivity at the two wavelengths is known. Therefore, the temperature is determined without knowing the emissivity of the object to be measured. In general, as long as the emissivity of the object to be measured does not change rapidly with wavelength, a fairly accurate temperature measurement might be obtained using the two color method.

However, both the one color and two color pyrometry methods are susceptible to errors caused by reflected radiation. Reflected radiation originates from sources other than the surface under consideration and reaches the pyrometer through reflection from the surface. Ceramics are a class of material which typically have low emissivity, and hence there is a high reflectivity in the band where conventional pyrometers operate. Consequently, a potential for large error exists when conventional pyrometry is employed to measure the temperature of ceramics.

DISCLOSURE OF THE INVENTION

It is therefore an object of this invention to provide a noncontact temperature measurement system which can accurately determine the temperature of a gray or nongray surfaces.

It is another object of this invention to provide a noncontact temperature measurement system which accurately measures the temperature of a gray or non-gray surface by taking into account the reflectivity of the surface and the component in the measured radiation which corresponds to energy from an extraneous interference source reflected off the surface.

These and other objects are achieved according to the present invention by providing a method and apparatus for determining the temperature of a gray and nongray object by measuring the radiation emanating from the object which contains an emissive component and a reflective component due to an extraneous interference source in the environment of the object to be measured.

The system for determining the surface temperature of the object to be measured contains a spectral radiometer connected to a computer. The spectral radiometer can have attached to its optical input a fiber optic cable which can withstand harsher environments than the spectral radiometer can withstand. The system also contains an auxiliary radiation source which can be an infrared source which is aimed at the surface and whose reflection is detected by the spectral radiometer so that the reflective properties of the surface to be measured can be taken into account. The measurement system will often include an extraneous interference source which cannot be removed from the environment which causes radiation to be reflected off the surface and detected by the spectral radiometer.

The temperature of the surface is calculated by measuring four spectra each including a plurality of wavelengths which can be, for example, from 2.5 $\mu$m to 14.5 $\mu$m, using the spectral radiometer. The four measured spectra are:

(1) a spectrum, $S_O$, the direct spectrum of the auxiliary radiation source;

(2) a spectrum $S_I$, the direct spectrum of the extraneous interference course;

(3) a spectrum $S_{II}$, of the surface in the presence of the extraneous interference source with the auxiliary radiation source turned off; and (4) a spectrum $S_{III}$, which is the spectrum of the surface in the presence of the extraneous interference source with the auxiliary radiation source turned on.

The spectrum $S_{II}$ which has been measured can be represented mathematically by the equation:

$$S_{II}(\lambda) = \left[1 - \frac{z(\lambda)}{f}\right]\frac{C_1}{\lambda^5} \frac{1}{\exp\left(\frac{C_2}{\lambda T}\right) - 1} + hz(\lambda) S_I(\lambda)$$

with the known $\lambda$ corresponding to the wavelength, $z(\lambda)$ corresponding to the measured reflectivity which is the quantity $S_{II}(\lambda)$-$S_{II}(\lambda)$ divided by $S_o(\lambda)$. $C_1$ and $C_2$ are known constants and $S_I(\lambda)$ has been measured. The unknown parameters are T, the temperature of the surface, and f and h which are parameters relating to the beam geometry of the system.

The spectra are measured within a predetermined wavelength range and therefore the three unknowns T, f, and h can be determined using a least-squares curve fitting computer program on the system computer. Therefore, an accurate temperature of the surface can be obtained which takes into account the measured emissivity and reflectivity of the surface and the radiation from an extraneous interference source which is reflected off the surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates the spectrum $S_{II}$ of an SiC surface in the presence of the extraneous interference radiation source without the auxiliary radiation source turned on. FIG. 4 also contains the spectrum $S_{III}$ of the SiC surface due to the extraneous interference radiation source and the auxiliary radiation source;

FIG. 5 also contains the spectrum $S_{II}^1(\lambda)$ which is the surface emission radiation.

BEST MODE FOR CARRYING OUT THE INVENTION

Figure 1:
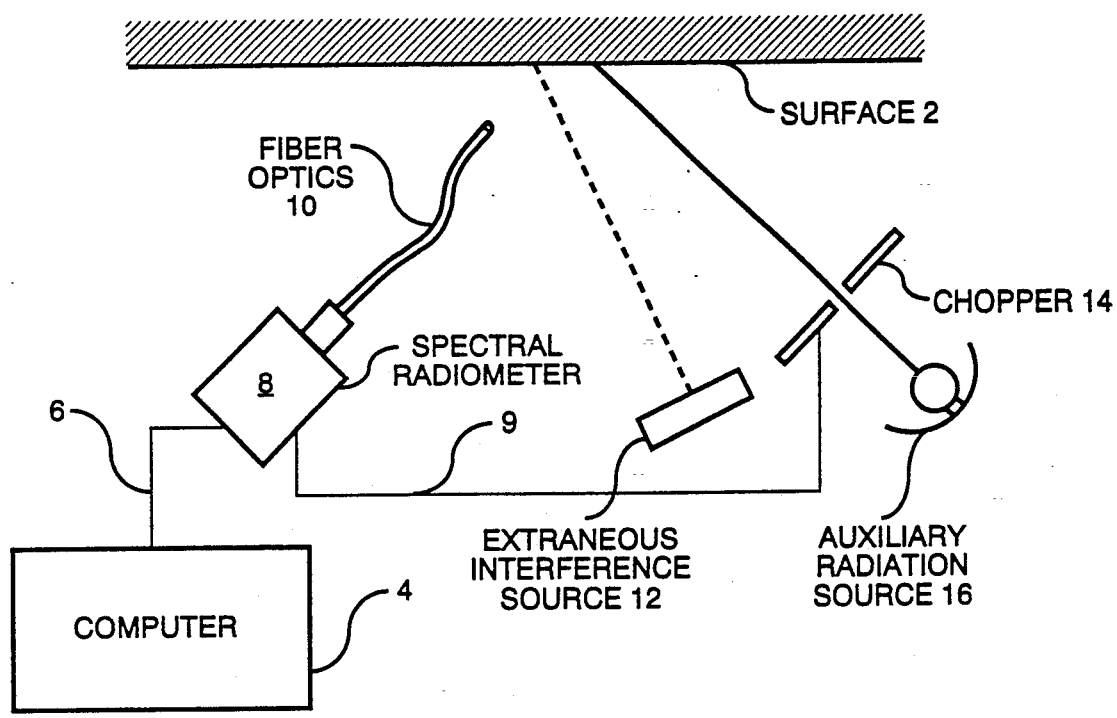
FIG. 1 is an illustration of a pyrometer system for measuring the spectrum of a surface and calculating the surface temperature.

Referring now to the drawings, wherein like reference numerals designate identical or corresponding parts throughout the several views, and more particularly to FIG. 1 thereof, there is illustrated a pyrometer system constructed in accordance with the present invention. A spectral radiometer 8 measures various spectra at a plurality of wavelengths within a range through fiber optics 10. The fiber optics allows a spectral measurement to be performed without subjecting the spectral radiometer to a possibly harsh environment where the surface to be measured exists, although the fiber optics is not absolutely necessary. A commercially available spectral radiometer such as model SR-500 from CI Corporation can be used. The spectral radiometer is connected to a computer 4 through a bus 6. The computer 4 can be any computer capable of interfacing with the radiometer and can be an IBM ® compatible personal computer, for example. The bus 6 can be implemented according to the IEEE 488 standard and contain a data bus and a control bus.

The extraneous interference source 12 can be any radiation source found in the environment of the pyrometry system. A heat lamp used to raise the temperature of the surface might be an extraneous interference source. The extraneous interference source can be simulated in a laboratory by a 40 W, nominal-temperature 644° K. soldering iron which has a temperature controller of unknown temporal stability, for example. It can be placed in front of the surface 2 in approximately the same angular relationship as an auxiliary radiation source 16 and should be well shielded from the direct view of the spectral radiometer.

The auxiliary radiation source 16 can be a 20 W infrared lamp, for example. The lamp can be regulated, for example, by a constant current power supply such that the typical light output rms ripple of the auxiliary radiation source is 0.05%. The auxiliary radiation source can be Model 6575 from the Oriel Corporation, for example. In the pyrometry system, spectral measurements must be taken both with and without the auxiliary radiation source so there should be a convenient way to turn the auxiliary radiation source on and off. The auxiliary radiation source 16 can manually be turned on and off or can be turned on and off automatically using a chopper 14.

Under certain conditions such as higher temperatures, the surface emission will greatly overwhelm the radiation reflected from the surface from the 20 W auxiliary radiation source. A reflected spectrum may not be accurately calculated by subtracting two spectra of a surface measured with and without the radiation source. However, the difference in spectra can be readily measured by chopping the auxiliary radiation source with a chopper 14 or using phase detection schemes using a lock-in amplifier. As most spectral radiometers have an external signal chopping capability, subtraction of the two spectra can be automatically performed by the spectral radiometer in a single operation. The chopper 14 accomplishes this function by selectively allowing the radiation from the auxiliary radiation source to pass. The chopping can be performed in a conventional manner by a mechanical device which periodically blocks the auxiliary radiation source. The on-off signal of the chopper is communicated to the phase detecting lock-in amplifier (internal or external to the spectrometer) to produce via a lead 9 a spectrum which is the difference of the signals when the auxiliary beam is on and when the auxiliary beam is not irradiating on the surface.

The spectral radiometer 8 can produce a spectrum either in voltage or in radiation energy units. When the spectrum produced is in volts, the voltage signal is a function of the wavelength of the received radiation, the intensity of the radiation, and the spectral radiometer responsivity. An obtained voltage spectrum can be converted into a radiation energy spectrum in radiation energy units by dividing the voltage spectrum by the radiometer's response function which can be obtained during routine calibration operations.

To obtain the temperature of the surface 2 illustrated in FIG. 1, four spectra are measured by the pyrometry system. The spectra are measured at a plurality of wavelengths within a range of wavelengths from 2.5 μm to 14.5 μm, for example. The first spectrum required is the spectrum of the auxiliary radiation source, $S_O(\lambda)$, and can be obtained prior to measurement of the surface spectra. The spectrum $S_O(\lambda)$ is obtained by directing the input of the radiometer directly at the auxiliary radiation source.

The second measured spectrum, $S_I(\lambda)$, is the spectrum of the extraneous interference source. The spectrum of the extraneous interference source is obtained by directing the input of the spectral radiometer directly at the extraneous interference source.

The next spectrum measured is $S_{II}(\lambda)$ which is the spectrum of the surface to be measured when the interfering radiation source is present. The spectrum $S_{II}(\lambda)$ contains two components; $S_{II}^1(\lambda)$ which is the spectrum of the surface emitted components; and $S_{II}^2(\lambda)$ which is the spectrum of the surface reflected radiation and includes the extraneous interference radiation source reflecting off of the surface. The auxiliary radiation source is turned off during the measurement of $S_{II}(\lambda)$.

The last measured spectrum, $S_{III}(\lambda)$, is the radiation spectrum of the surface in the presence of the extraneous interference radiation source and the auxiliary radiation source.

Once the spectra $S_O(\lambda)$, $S_I(\lambda)$, $S_{II}(\lambda)$, and $S_{III}(\lambda)$ are obtained, calculations can be performed using the computer attached to the spectral radiometer to determine the temperature of the surface. While the spectra are in a digital representation in the computer, the numbers which are in the computer are representative of the radiation spectra which are physical signals representing physical characteristics of the surface to be measured.

The spectrum $S_{II}(\lambda)$ has been determined through measurement and can be mathematically expressed using an equation which contains the parameter T, corresponding to the temperature of the surface. By choosing a value $T = T_e$ in the equation representing the spectrum $S_{II}(\lambda)$ to yield calculated values equal to the measured value of the spectrum $S_{II}(\lambda)$, the unknown temperature T of the surface can be determined.

A mathematical expression for the spectrum $S_I(\lambda)$ is written as the sum of two terms:

$$S_{II}(\lambda) = S_{II}^1(\lambda) + S_{II}^2(\lambda) \qquad (1)$$

The component $S_{II}^1(\lambda)$ describes the spectrum of the surface emission radiation. It is a Planck function modified by the wavelength-dependent emissivity of the non-gray or gray surface and is known to be:

$$S_{II}(\lambda) = e(\lambda) \frac{C_1}{\lambda^5} \frac{1}{\exp\left(\frac{C_2}{\lambda T}\right) - 1} \qquad (2)$$

In equation 2, $e(\lambda)$ is the emissivity of the surface, $C_1$, $C_2$ are radiation constants having the values $3.741832 \times 10^{-16}$ W·m² and $1.43879 \times 10^{-2}$ m·K respectively, $\lambda$ is the wavelength, and T is the temperature of the surface $C_1$ is $2\pi c^2 h$ and $C_2$ is $ch/k$ where $c = 3 \times 10^8$ m/sec is the velocity of light, $h = 6.6 \times 10^{-34}$ J-sec is the Planck constant, $k = 1.38 \times 10^{-23}$ J/K is Boltzman's constant.

Kirchhoff's law states: emissivity + reflectivity = 1 (3)

As emissivity is a function of wavelength $\lambda$, $\beta$ and $\theta$ which refer to the polar angular coordinate angles specifying a direction with reference to a suitably chosen coordinate system, and $T_e$, the temperature of the surface, Kirchhoff's law can be written as:

$$e(\lambda,\beta,\theta,T_e) + r(\lambda,\beta\theta,T_e) = 1 \qquad (5)$$

Solving Kirchhoff's law for emissivity gives:

$$e(\lambda,\beta,\theta,T_e) = 1 - r(\lambda,\beta\theta,T_e) \qquad (4)$$

In pyrometry applications, the angular dependence disappears because the optics of a pyrometers detector selects signals in a narrowly defined direction. As a result, only the wavelength dependence needs to be considered at a particular temperature. The emissivity of the surface is therefore given by:

$$e(\lambda) = 1 - r(\lambda) \qquad (6)$$

For the pyrometer system of the present invention, the measured reflectivity, $z(\lambda)$, at any wavelength is the ratio:

$$z(\lambda) = \frac{S_{IV}(\lambda)}{S_O(\lambda)} \qquad (7)$$

where $S_{IV}(\lambda)$ is the reflected radiation due to the auxiliary radiation source and $S_O(\lambda)$ is the unobstructed spectrum of the auxiliary radiation source. $S_{IV}(\lambda)$ is equal to the spectrum $S_{III}(\lambda) - S_{II}(\lambda)$ Which substituted into equation 7 yields:

$$z(\lambda) = \frac{S_{III}(\lambda) - S_{II}(\lambda)}{S_O(\lambda)} \qquad (8)$$

As all terms of equation 8 have been measured, the value $z(\lambda)$ can be calculated using the computer 4.

Because $S_O(\lambda)$ was measured on a direct path; that is it was not reflected off of the surface, whereas $S_{III}(\lambda)$ and $S_{II}(\lambda)$ were measured on a reflected path off of the surface, the ratio $z(\lambda)$ does not represent the true reflectivity but is the true reflectivity modified by a constant f. Therefore, the true reflectivity r can be expressed as:

$$r(\lambda) = \frac{z(\lambda)}{f} \qquad (9)$$

where f is an unknown and must be determined. In principal, the constant f can be determined from the geometry of the experimental set up. However, it can more easily be determined by conventional curve fitting as will be explained later, and for out of laboratory situations, the constant f may not be able to be determined from the geometry of the set up.

Substituting the value of $r(\lambda)$ of equation 9 into equation 6 gives the emissivity as:

$$e(\lambda) = 1 - \frac{z(\lambda)}{f} \qquad (10)$$

Substituting the value of the emissivity from equation 10 into equation 2 results in:

$$S_{II}^1(\lambda) = \left[1 - \frac{z(\lambda)}{f}\right]\frac{C_1}{\lambda^5}\frac{1}{\exp\left(\frac{C_2}{\lambda T}\right) - 1} \quad (11)$$

$S_{II}^2(\lambda)$ describes the reflected interfering radiation from the extraneous interference radiation source. $S_{II}^2(\lambda)$ is proportional to the product of the surface reflectivity $r(\lambda)$, $S_I(\lambda)$ which is the spectrum of the extraneous interference radiation source, and a constant of proportionality g due to beam geometry. Even though g and f are both constants which result because of beam geometry, g is a different constant than f.

Therefore, $S_{II}^2(\lambda)$ can be represented as:

$$S_{II}^2(\lambda) + gr(\lambda)S_I(\lambda) \quad (12)$$

Substituting for the reflectivity from equation 9 gives:

$$S_{II}^2(\lambda) = g\frac{z(\lambda)}{f}S_I(\lambda) \quad (13)$$

If the ratio g/f of equation 13 is replaced by:

$$h = \frac{g}{f} \quad (14)$$

where h is a constant, the equation:

$$S_{II}^2(\lambda) = hz(\lambda)S_I(\lambda) \quad (15)$$

is obtained. In equation 15, $z(\lambda)$ is obtained by calculating equation 8.

Substituting $S_{II}^1(\lambda)$ from equation II and $S_{II}^2(\lambda)$ from equation 15 into equation 1 gives:

$$S_{II}(\lambda) = \left[1 - \frac{z(\lambda)}{f}\right]\frac{C_1}{\lambda^5}\frac{1}{\exp\left(\frac{C_2}{\lambda T}\right) - 1} + hz(\lambda)S_I(\lambda) \quad (16)$$

where $C_1$ and $C_2$ are first and second radiation constants, $\lambda$ is the wavelength, $z(\lambda)$ is the measured reflectivity and calculated according to equation 8 and $S_I(\lambda)$ is the measured direct spectrum of the extraneous interference source. The adjustable parameters f, h (or g), and T, the temperature are unknowns. The constants f and h are included in equation 16 to account for beam geometry. These constants may be equal to 1 under certain conditions. However, if they are considered to be 1, inaccurate temperature determinations will probably result.

Equation 16 for the spectrum $S_{II}(\lambda)$ contains three unknowns, one of them being temperature. Accordingly, the equation for the spectrum $S_{II}(\lambda)$ cannot be algebraically solved for temperature but must be solved in some other way. One way to solve for temperature is using least-squares curve fitting with $\lambda$, $z(\lambda)$ and $S_I(\lambda)$ treated as independent variables and solving for the parameters f, h and T. Even though there are three unknowns and one equation, the spectra have been measured over a spectral range, e.g. at a plurality of wavelengths, and therefore, it is possible to accurately determine the three unknowns. The computer 4 can quickly determine the temperature T and f and h using a commercially available least-squares software package. Examples of commercially available software which can perform the least squares function are RSI by BBN Software Product Corporation of Massachusetts, or SAS by the SAS Institute, Inc. of Cary, N.C.

Each of the spectrum is measured at a plurality of wavelengths within a wavelength range of 2.5 μm to 14 μm, for example. The least-squares method for solving equation 16 for the unknowns operates as follows. A guess is made for the value of the temperature T and the other unknowns f and h. At each wavelength, the spectrum is calculated using these guesses in equation 16. Because these values are only guesses, there will probably be a difference between the value of the left side of equation 16 and the value of the right side of equation 16. The squares of these differences at each wavelength are added together. Different guesses are then made for each of the three unknown parameters and substituted into equation 16 and compared with the experimentally determined data. The difference between the experimentally measured spectrum and the calculated spectrum are subtracted for each wavelength and these differences are squared and added together. The combination of T, f, and h that gives the least squares is the correct combination. The least-squares computer program can perform many guesses to get accurate values for the parameters T, f and h which therefore gives an accurate determination of the temperature of the surface.

After the spectra are measured over a range of wavelengths, not only is the temperature T determined but the parameters f and h are also determined. If the geometry of the system is not changed, the parameters f and h will not change and therefore, subsequent temperature measurements with the same geometry do not have to be performed over a range of wavelengths and the least squares curve fitting program does not have to be used. The spectra $S_{II}$ and $S_{III}$ must be measured again but the measurement needs only be performed at one wavelength. This wavelength should be at a location where the fitted curved determined by least-squares fitting is close to the measured curve and therefore has a small error. It is not necessary to again determine the spectrum $S_O$ of the auxiliary radiation source as this spectrum should remain constant. If the spectrum $S_I$ of the extraneous interference source changes over time, the spectrum of the extraneous interference source should be measured again. If there is little possibility of the spectrum of the extraneous interference source changing, it may not be necessary to again measure the spectrum of the extraneous interference source. Therefore, once the four spectra are measured over a wavelength range and curve fitting has been performed to determine the parameters f and h, subsequent temperature measurements which use the same system geometry can be very quickly made as only two or three spectra need to be measured at one wavelength with no need to perform subsequent curve-fitting analysis.

Figure 2:
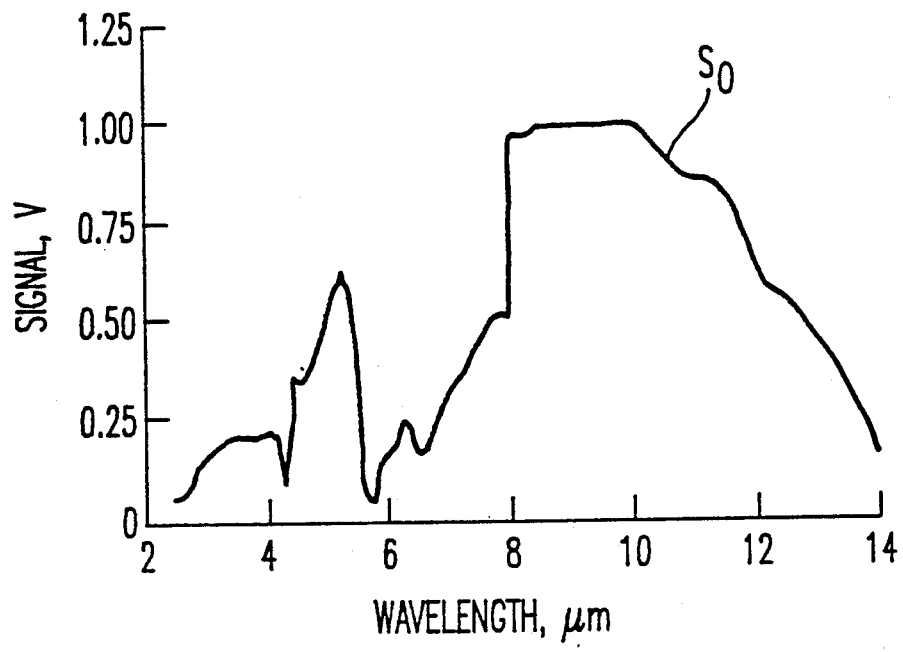
FIG. 2 illustrates a non-obstructed spectrum $S_o$ of an auxiliary radiation source.

An experiment was performed to examine the accuracy of the invention. A non-gray silicon carbide (SiC) wafer sample measuring 3 by 25 by 50 mm nominally polished to a 10 μm finish was used as surface 2. The SiC surface was heated and allowed to equilibrate in front of a black body furnace. The SiC sample completely covered the black body cavity opening of the furnace. The black body furnace temperature was regulated by a temperature controller within plus or minus 0.5° C. The auxiliary radiation source was regulated by a constant-current power supply such that its typical light output RMS ripple was 0.05%. The spectrum, illustrated in FIGS. 2–5 were then measured at a plurality of wavelengths within a range from 2.5 $\mu$m to 14.5 $\mu$m and contain 323 measurements or channels. Between 2.5 $\mu$m and 4.39 $\mu$m, the channel spacing was 0.018 $\mu$m, between 4.39 and 7.985 $\mu$m, the channel spacing was 0.034 $\mu$m, and between 7.985 and 14.5 $\mu$m, the channel spacing was 0.06 $\mu$m. The first measured spectrum was the spectrum of the auxiliary radiation source, $S_O(\lambda)$. In the experiment, the auxiliary radiation source was a 20 watt infrared lamp regulated by constant current supply. The spectrum produced is illustrated in FIG. 2 in volts and was directly determined by the spectral radiometer.

Figure 3:
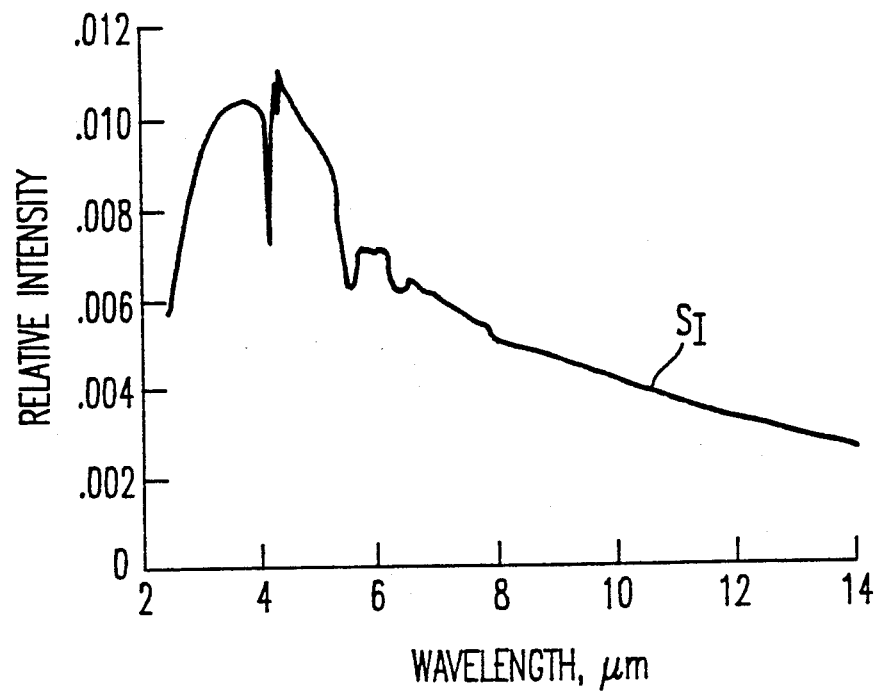
FIG. 3 illustrates the spectrum $S_I$ of an extraneous interference source.

The second measured spectrum, $S_I$ of the extraneous interference source is illustrated in FIG. 3 showing the relative intensity at different wavelengths in energy units. The relative intensity in arbitrary energy units is obtained by dividing the spectrum of the extraneous interference source in volts by the response function of the radiometer which is easily determined through calibration of the radiometer.

Figure 4:
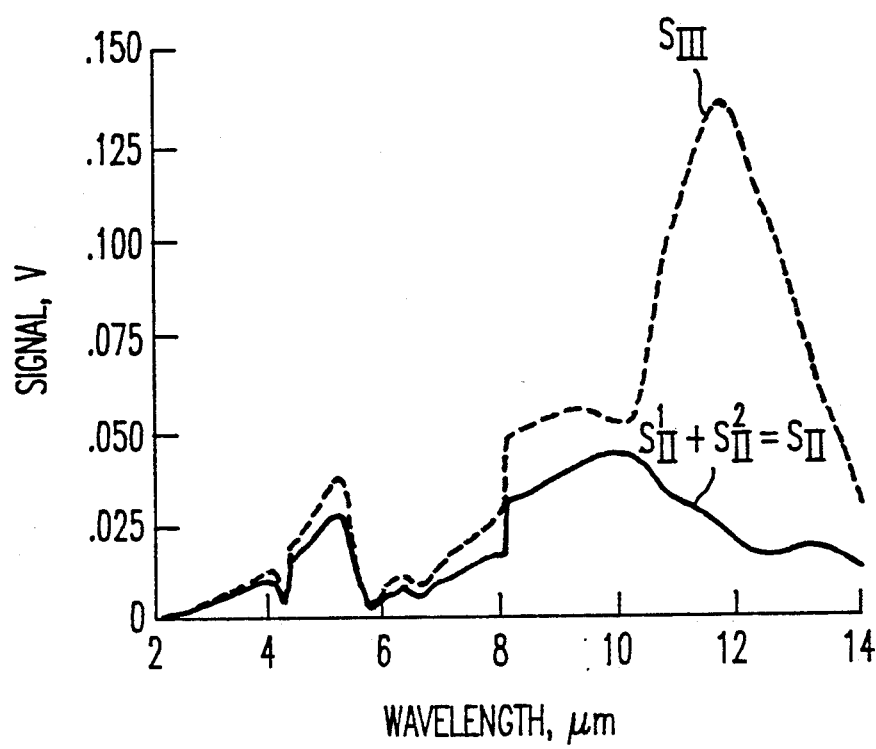
Figure 5:
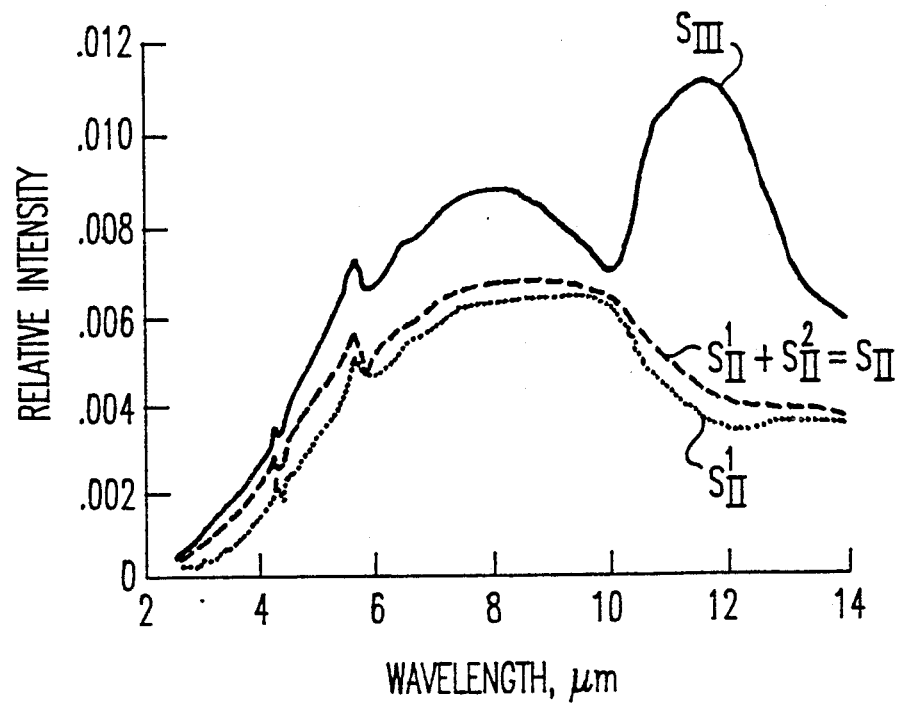
FIG. 5 illustrates the spectra illustrated in FIG. 4 in energy units.

The third measured spectrum is the spectrum of the SiC surface in the presence of the extraneous interference radiation source with the auxiliary radiation source turned off. The spectrum is illustrated in FIG. 4 in volts and in two components, the emitted component and the reflected component corresponding to $S_{II}^1$ and $S_{II}^2$ respectively. FIG. 5 also contains the spectrum of $S_{II}^1$ by itself. This spectrum is not used for any measurements but has been illustrated to show the effect of the extraneous interference source on the spectrum of the surface. FIG. 5 illustrates that at short wavelengths, the interference component of spectrum $S_{II}$ is over 50% of the spectrum; at other wavelengths, the effect is not as great. However, FIG. 5 illustrates the importance of taking into account the effect on the spectrum due to the extraneous interference source.

The last measured spectrum $S_{III}$, represents the spectrum of the surface with the auxiliary radiation source turned on in the presence of the extraneous interfering source. FIG. 4 illustrates spectrum $S_{III}$ in volts and FIG. 5 illustrates the spectrum $S_{III}$ in energy units.

Equation 6 has two terms, $z(\lambda)$ and $S_I(\lambda)$ which relate to the measured spectra. As $z(\lambda)$ is a unitless number between 0 and 1 corresponding to the reflectivity of the surface, there is no need to convert the spectra used to define $z(\lambda)$ from volts to energy units. This is because $z(\lambda)$ is the ratio of two spectra and the units divide out of the reflectivity term. However, the spectrum $S_I(\lambda)$ of equation 16 must be in the proper units and therefore the spectrum $S_I(\lambda)$ must be divided by the response of the spectral radiometer so that the spectrum $S_I(\lambda)$ has the proper energy units.

Figure 6:
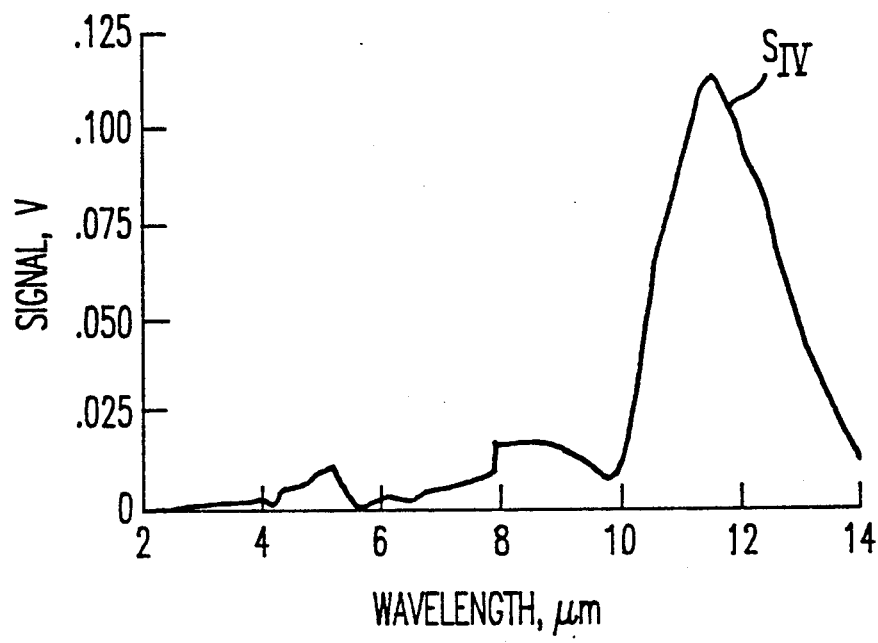
FIG. 6 illustrates the spectrum $S_{IV}$ of the surface which is equal to the spectrum $S_{III}(\lambda)$-$S_{II}(\lambda)$ due to the incidence of the auxiliary radiation source on the surface.

FIG. 6 illustrates the spectrum $S_{IV}$ and corresponds to the difference of the spectra $S_{III}$ and the spectra $S_{II}$. The spectrum $S_{IV}$ of FIG. 6 can be obtained by mathematically subtracting the spectrum $S_{III}$ from $S_{II}$ or can be directly determined by the spectral radiometer when the radiometer has an input in which the auxiliary radiation source is chopped.

Figure 7:
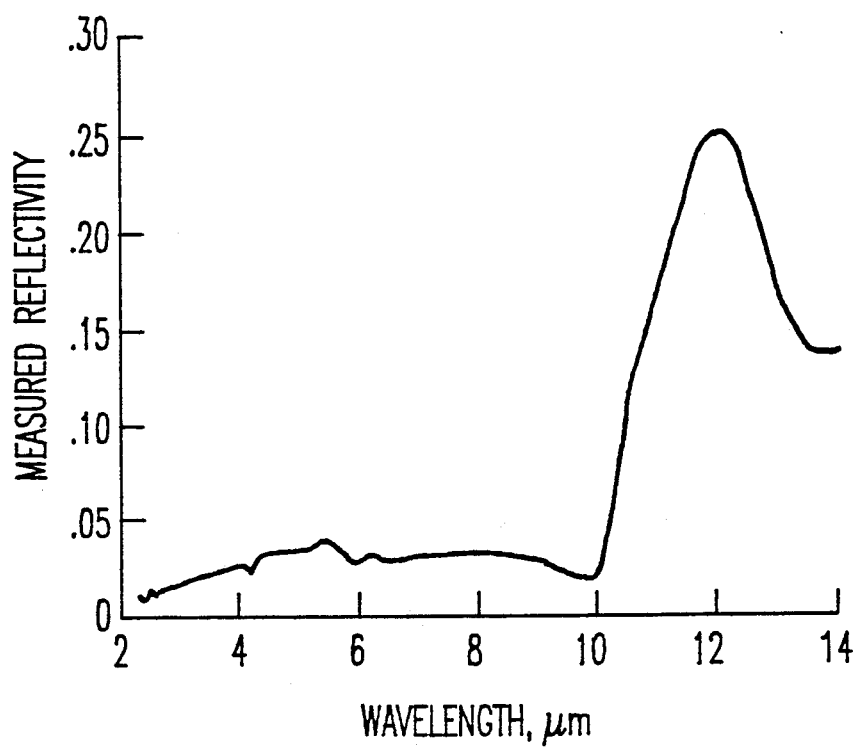
FIG. 7 illustrates the spectrum $S_{IV}$ of FIG. 6 divided by the unobstructed spectrum $S_o$ of FIG. 2.

FIG. 7 illustrates the measured reflectivity, $z(\lambda)$ which corresponds to the quantity $S_{III}(\lambda) - S_{II}(\lambda)$ divided by the spectrum $S_O(\lambda)$, as expressed in equation 8.

Figure 8:
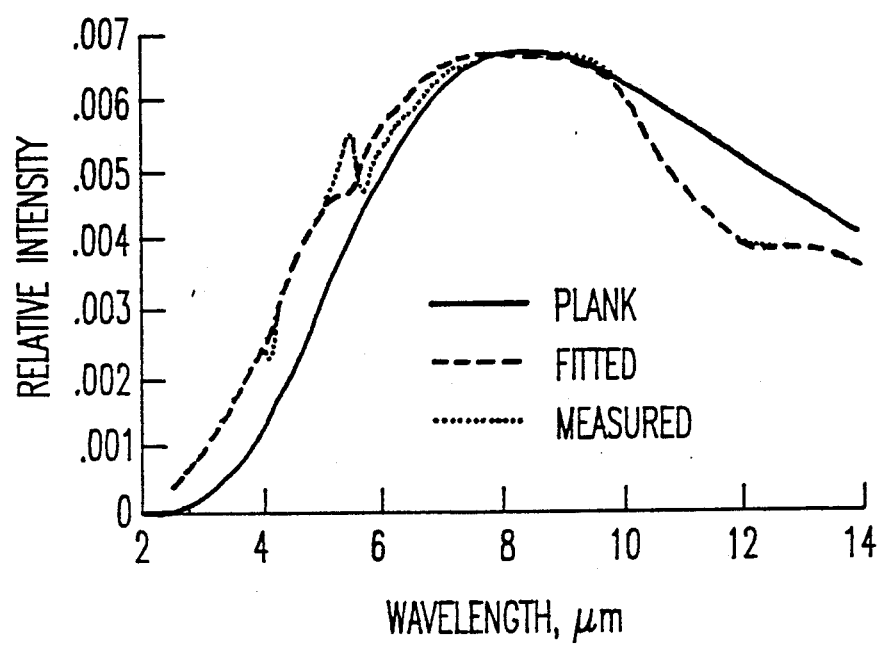
FIG. 8 illustrates the measured $S_{II}$ spectrum of the SiC surface, a curve-fitted calculation of the $S_{II}$ spectrum and the theoretical Planck curve of the spectrum.

From the measured and calculated spectra, the curve fitting program yielded the surface temperature of 341.3° K., f=0.375 and h=3.49. The fitted curve, corresponding to equation 16 is illustrated in FIG. 8 together with the measured surface spectrum emission and the 341.3° K. Planck curve. The 341.3° K. Planck curve is the theoretical spectrum of a black surface at 341.3° K. without taking into account the radiation from the extraneous interference source which has been reflected off the surface.

The actual temperature of the surface was determined to be 339.7° K. using a 0.125 mm (5 mil) type K (Chromel-Alumel) thermocouple which is in agreement with the multiwavelength pyrometry measurement of 341.3° K. to within 1%. Analysis was also performed without taking into account the extraneous interference radiation source and the temperature was determined to be 373.4° K. Therefore, neglecting the effect of the interference would introduce an error of about 10% as compared with an error of about 1% when the extraneous interference radiation source was taken into account.

Obviously, numerous modifications and variations of the present invention are possible in light of the above teachings. It is therefore to be understood that within the scope of the appended claims, the invention may be practiced otherwise than as specifically described herein.

I claim:

1. A pyrometer apparatus for detecting a temperature of a gray or non-gray surface which is receiving undesirable extraneous interfering radiation from an interfering radiation source comprising:

an auxiliary radiation source which directs auxiliary radiation onto said gray or non-gray surfaces;

a chopper for selectively allowing radiation to pass from the auxiliary radiation source to said surface;

a spectral radiometer for detecting and measuring a respective radiation spectrum of each of the auxiliary source, the gray or non-gray surfaces and the extraneous radiation source wherein $S_0$ represents the spectrum of the auxiliary radiation source, $S_I$ represents the spectrum of the interfering radiation source, $S_{II}$ represents the spectrum of the surfaces in the presence of the extraneous radiation when the chopper is not allowing radiation from the auxiliary source to reach the surface, $S_{III}$ represents the spectrum of the surfaces in the presence of the extraneous radiation when the chopper is allowing the radiation from the auxiliary source to reach the surface; and, a computer connected to the radiometer, said computer being programmed to:

calculate a surface reflectivity of the surface by dividing the $S_{III}$ spectrum minus the $S_{II}$ spectrum by the $S_O$ spectrum;

calculate a surface emissivity by subtracting from 1 the calculated surface reflectivity divided by f; and solve for T the equation $$S_{II}(\lambda) = \left[1 - \frac{z(\lambda)}{f}\right] \frac{C_1}{\lambda^5} \frac{1}{\exp\left(\frac{C_2}{\lambda T}\right) - 1} + hz(\lambda) S_I(\lambda)$$

where $\lambda$ is a wavelength, $z(\lambda)$ is the measured reflectivity, $C_1$ and $C_2$ are radiation constants, and f and h are constants relating to a geometry of the pyrometry apparatus, using a method of least squares.

2. A pyrometer apparatus for detecting a temperature of a gray or non-gray surface according to claim 1, wherein the chopper is connected to the spectral radiometer and the spectral radiometer measures the spectrum $S_{III} - S_{II}$ when the auxiliary radiation source is chopped by the chopper.

* * * * *